United States Patent
Sullivan

(10) Patent No.: US 7,389,525 B2
(45) Date of Patent: *Jun. 17, 2008

(54) SYSTEM AND METHOD FOR AUTOMATICALLY DETECTING AND GENERATING ELECTRONIC PROGRAM GUIDE ENTRIES OF FUTURE PROGRAMMING

(75) Inventor: Gary E. Sullivan, Mansfield, TX (US)

(73) Assignee: Gateway Inc., Irvine, CA (US)

( * ) Notice: Subject to any disclaimer, the term of this patent is extended or adjusted under 35 U.S.C. 154(b) by 1108 days.

This patent is subject to a terminal disclaimer.

(21) Appl. No.: 10/413,330

(22) Filed: Apr. 14, 2003

(65) Prior Publication Data

US 2003/0192048 A1 Oct. 9, 2003

Related U.S. Application Data

(63) Continuation of application No. 09/383,104, filed on Aug. 25, 1999, now Pat. No. 6,591,421.

(51) Int. Cl.
*H04N 5/445* (2006.01)

(52) U.S. Cl. .............................. 725/50; 725/39; 725/49

(58) Field of Classification Search ...................... None
See application file for complete search history.

(56) References Cited

U.S. PATENT DOCUMENTS 6,057,890 A * 5/2000 Virden et al. ............... 348/563

6,591,421 B1 * 7/2003 Sullivan ...................... 725/50

\* cited by examiner

*Primary Examiner*—Christopher Grant
*Assistant Examiner*—Oschta Montoya
(74) *Attorney, Agent, or Firm*—Ross F. Hunt, Jr.; Stites & Harbison PLLC

(57) ABSTRACT

An information handling system for utilizing an electronic program guide and a method for generating a future program guide are disclosed. A processor executes a program of instructions for the information handling system, and a memory stores the program of instructions that comprises a program guide for causing the information handling system to obtain current program guide information, to compare the current program guide information to previous program guide information, to thereby generate future programming information, and to generate a future program guide based upon the future programming information. The current program guide information is obtained from a program information source, and the previous program guide information is stored in an information storage medium of the information handling system. If a program of the current program guide information is the same as a program of the previous program guide information, the program is set as a recurring program, and a future program guide is generated that includes the recurring program.

24 Claims, 4 Drawing Sheets

SYSTEM AND METHOD FOR AUTOMATICALLY DETECTING AND GENERATING ELECTRONIC PROGRAM GUIDE ENTRIES OF FUTURE PROGRAMMING

CROSS REFERENCE TO RELATED APPLICATIONS

The present application is a continuation of U.S. patent application Ser. No. 09/383,104, filed Aug. 25, 1999 now U.S. Pat. No. 6,591,421. Said U.S. patent application Ser. No. 09/383,104 is herein incorporated by reference in its entirety.

FIELD OF THE INVENTION

The present invention generally relates to the field of information handling systems and particularly to an electronic program guide for an information handling system.

BACKGROUND OF THE INVENTION

It is often desirable to provide a program guide in an electronic format that provides programming information such as broadcast or cable television programming schedules for regularly scheduled programs and events. The electronic program guide (or EPG) may be compiled by a service provider and delivered to the user via electronic transmissions systems. The electronic program guide is then displayable on an information handling system such that the user may view the programming information to decide which programs to watch and at what times to watch them.

One disadvantage of the traditional electronic program guide is that it typically only includes information for a predetermined time period, typically 72 hours (3 days) from the date and time of the download. Thus, a user is not able to view programming information for time periods beyond the end time of the period covered by the downloaded programming guide data. Furthermore, if a user wanted to set up a recording device to record a recurring program on a recurring basis, the user would not be certain that a given program is a recurring program on the basis of the program guide since the program guide only provides information for a predetermined window of time and not beyond the end time of the program guide data. Additionally, if a user desired to set up an information handling system to remind the user of the start time of a recurring program, the user could not do so with the limited program guide data.

Thus, there lies a need to provide an electronic program guide for an information handling system that is capable of generating a future program guide by determining program guide data beyond the window of time provided by downloaded program guide data. Further, it would be highly desirable to determine which programs in a set of program guide data are recurring programs such that the recurring programs may be indicated in the electronic program guide.

SUMMARY OF THE INVENTION

The present invention is directed to an information handling system for utilizing an electronic program guide and for generating a future program guide. In one embodiment, the information handling system includes a processor for executing a program of instructions for the information handling system, and a memory coupled to the processor for storing the program of instructions. The program of instructions comprises a program guide storable in the memory and executable by the processor for causing the information handling system to obtain current program guide information, to compare the current program guide information to previous program guide information stored in an information storage medium coupled to the processor to thereby generate future programming information, and to generate a future program guide based upon the future programming information.

The present invention is further directed to a method for generating program guide information in an information handling system. In one embodiment, the method includes steps for obtaining current program guide information from a program information source, reading previous program guide information from an information storage medium coupled to the information handling system, determining whether a program of the current program guide information is the same as a program of the previous program guide information, in the event it is determined that a program of the current program guide information is the same as a program of the previous program guide information, setting the program as a recurring program, and generating a future program guide by including the recurring program in the future program guide.

It is to be understood that both the forgoing general description and the following detailed description are exemplary and explanatory only, and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
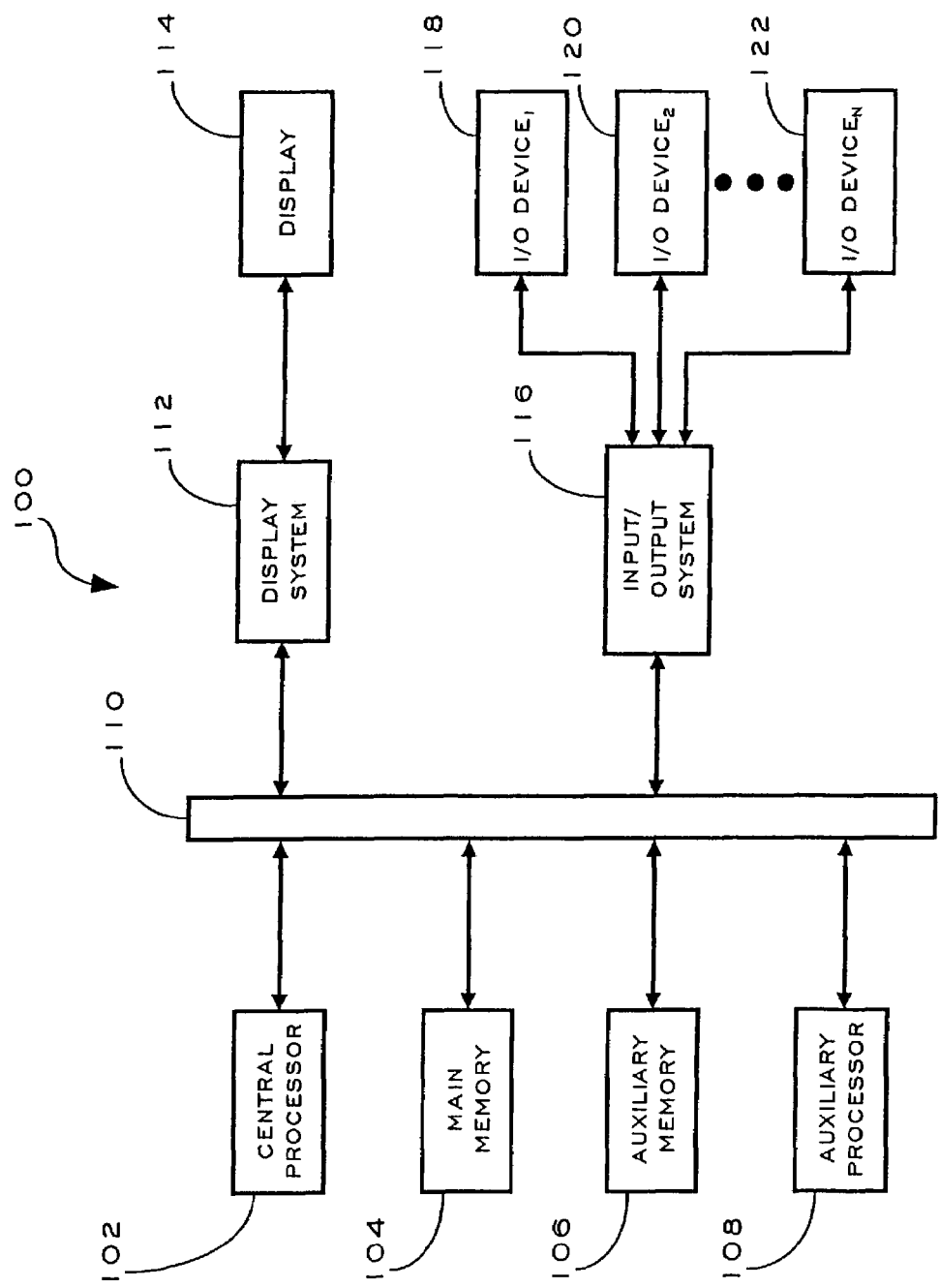
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processor 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 110 may be compliant with any promulgated industry standard. For example, bus 110 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), as examples.

Other components of information handling system 100 include main memory 104, auxiliary memory 106, and an auxiliary processor 108 as required. Main memory 104 provides storage of instructions and data for programs executing on central processor 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118 and 120, and up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118-122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118-122 may provide or receive analog or digital signals for communication between information handling system 100 of the present invention and external devices, networks, or information sources. Input/output system 116 and I/O devices 118-122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
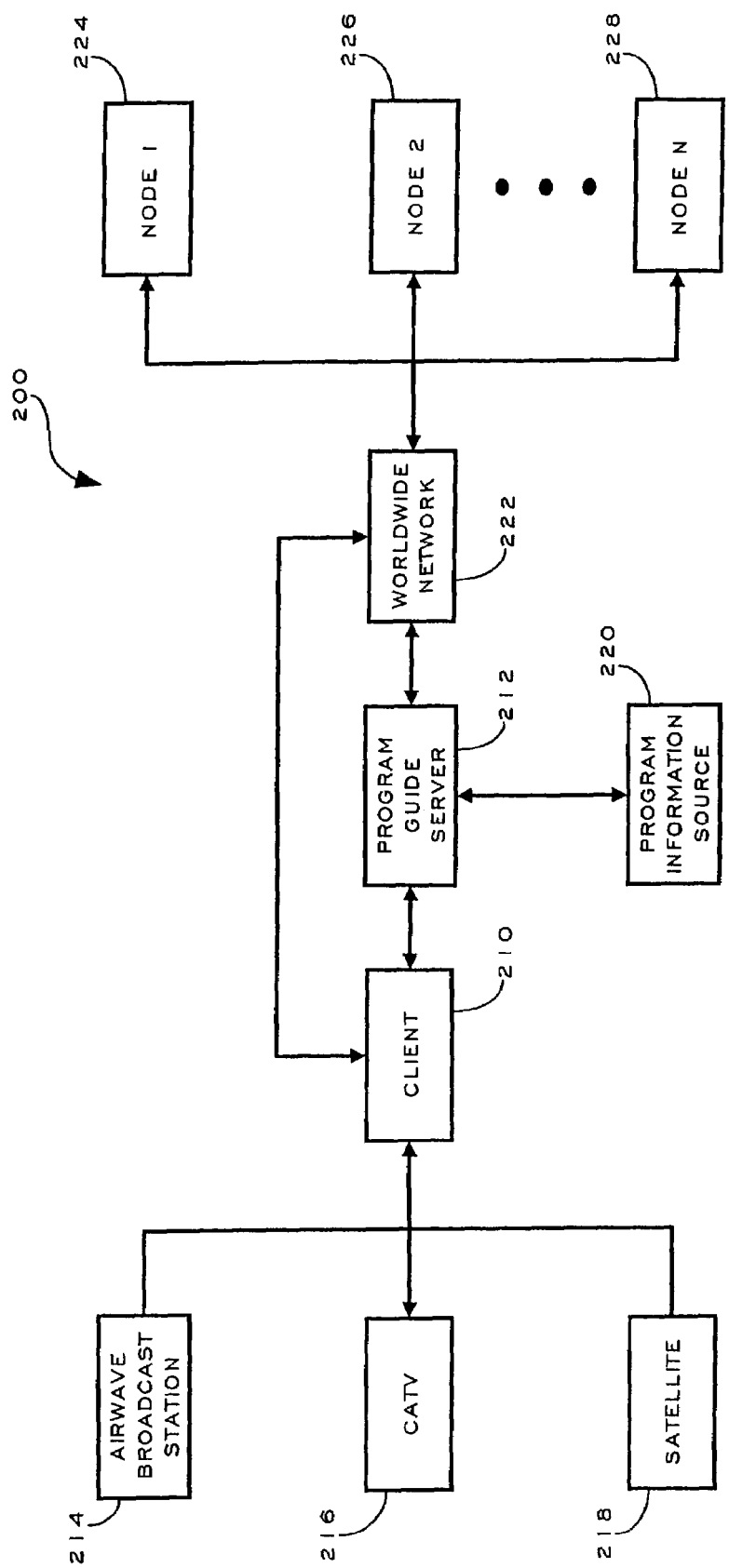
FIG. 2 is a block diagram of an electronic program guide system in accordance with the present invention.

Referring now to FIG. 2, a block diagram of an electronic program guide system in accordance with the present invention will be discussed. The program guide system 200 includes a client system 210 and a program guide server system 212. Client 210 and program guide server 212 may be an information handling system 100 as shown in FIG. 1. However, depending upon the requirements of the intended application, not all of the hardware devices need be included or identical as information handling system 100. For example, client 210 may not require auxiliary processor 108. Program guide server 212 and client 210 preferably, but not necessarily, implement a client-server based architecture wherein the execution of a program of instructions may occur on either client, 210, server 212, or on both client 210 and server 212. Client 210 couples with program guide server 212 for obtaining programming information in the form of an electronic program guide. The program guide may be obtained and processed by program guide server 212 from an appropriate program information source 220 and stored in an information storage medium coupled to program guide server 212. At an appropriate time upon a request by client 210, program guide server 212 may download the program guide to client 210 that is in turn stored in an information storage medium coupled to client 210. As shown in FIG. 1 client 210 may be configured to receive the program guide from program guide server 212, may be configured to receive programming content from airwave broadcast station 214, cable television provider 216, and/or satellite television provider 218, and further may be configured to receive content from worldwide network 222. However, it is not necessary that a single device (e.g., client 210) perform all of the aforementioned functions. For example, client 210 may be an information handling system that couples to program guide server 212 to obtain program guide information that may be displayed on a standard television device separate from client 210 wherein the television device receives the program broadcast from airwave broadcast station 214. Further, a second information handling system may couple to worldwide network 222 to receive and display a multimedia network program. It is preferable, however to provide a single device (e.g., client 210) that is capable of providing all functions described herein. A suitable single device may be, for example, a personal computer and television (PC-TV) convergence device.

Client 210 may be capable of receiving program content from one or more sources. For example, client 210 may include a television tuner as an 1/0 device for receiving programming from a local airwave broadcast station 214. The programming received from airwave broadcast station 214 may be an analog signal (e.g., being compliant with a National Television Standards Committee or "NTSC" standard) or digital signal (e.g., being compliant with a high-definition television or "HDTV" standard). Client 210 may also receive a cable television signal from a cable television provider 216 by utilizing an appropriate cable television receiver, or may receive a satellite television signal from a satellite television provider 218 by utilizing an appropriate satellite television receiver and antenna. Furthermore, client 210 may include appropriate hardware for coupling to a worldwide network 222 such as the Internet. Worldwide network 222 may include at least one or more nodes 224 and 226, up to N number of nodes 228, comprising information handling systems similar to information handling system 100 on which programming content may be stored or through which programming content may be delivered and accessible to client 210 via worldwide network 222. For example, one of nodes 224-228 may belong to the National Aeronautics and Space Administration (NASA) and may provide live video coverage of the launch of a space vehicle (e.g., the space shuttle) over worldwide network 222 to client 210. Program information source 220 may include one or several sources of programming information. For example, program information source 220 may include an information handling system of a local or national television network that makes programming information available to program guide server 212 for future programs to be broadcast, for example, by airwave broadcast station 214, cable television station 216 or satellite television provider 218. Upon being downloaded from program guide server 212 to client 210, the program guide may be displayed on a display coupled to client 210 (e.g., display 114).

Figure 3:
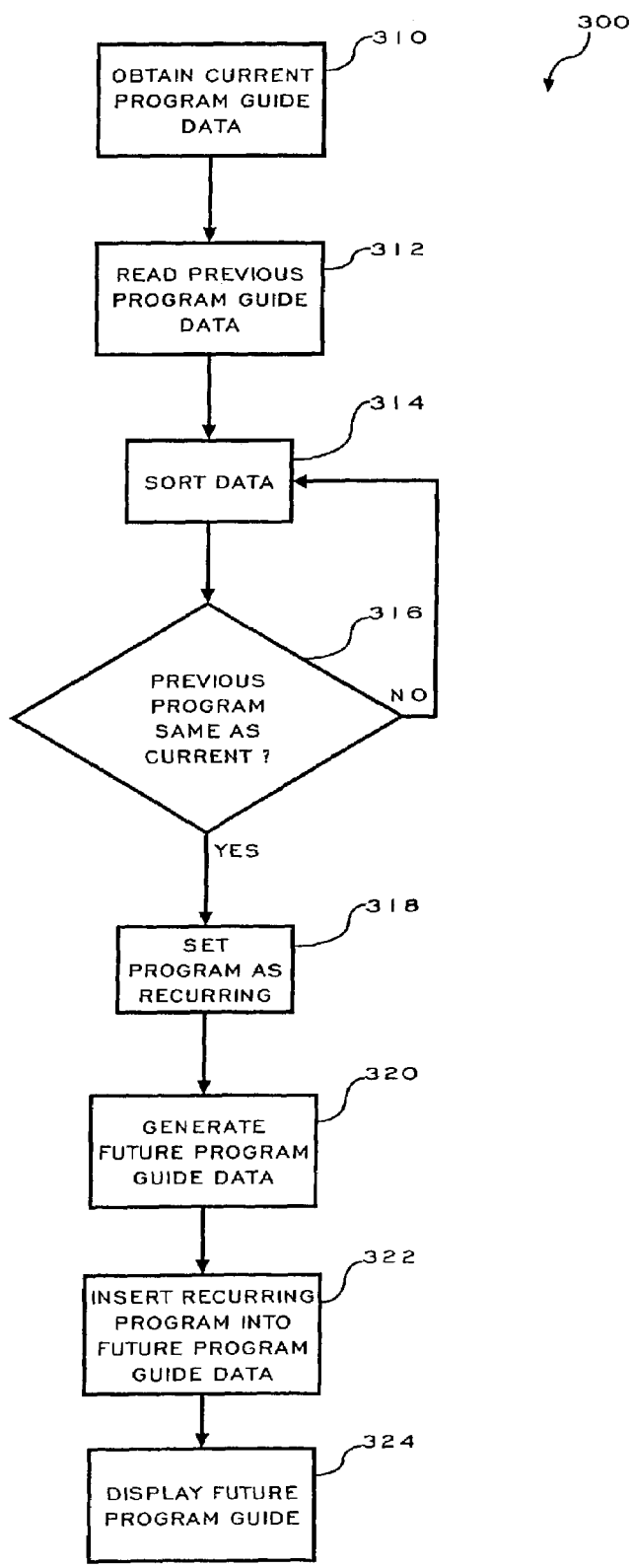
FIG. 3 is a flow diagram of a method for detecting and generating program guide entries of an electronic program guide for future programming in accordance with the present invention.

Referring now to FIG. 3, a flow diagram of a method for detecting and generating program guide entries of an electronic program guide for future programming will be discussed. The method 300 may be embodied as a program of instructions executed by an information handing system such as client 210 that configures the information handing system to perform the steps of method 300. Method 300 initiates with the obtaining of current program guide data at step 310. For example, current program guide data may be obtained from program information source 220, worldwide network 222, etc. Typically, the program guide data covers a predetermined time period such as 72 hours (3 days). Thus, current program guide data downloaded on Thursday may include scheduled programming information for Thursday, Friday and Saturday. Previous program guide data is read at step 312 and may be stored in a list stored in an information storage medium coupled to client 210 such as auxiliary memory 106. The previous program guide data may be accumulated for a one-week period since recurring programs typically recur on a weekly basis. The period covered for the previous program guide data may be varied according to the period covered by current program guide data such that at least one program on a given day and time period of a first week may be compared to at least one program on the same day at the same time period for a previous week or a future week. For example, if the current program guide data includes programming information for Friday of the current week at 10:00 p.m., the previous program guide data will also include programming information for Friday of the previous week at 10:00 p.m. so that a comparison may be made between the previous Friday's program scheduled at 10:00 p.m. with current Friday's program scheduled at 10:00 p.m. The program guide data for the previous week and for the current week are sorted at step 314 so that like types of information may be compared. For example, program guide data may include values representing the day of the week on which the program is scheduled, the start and stop times of the program, the program channel, the title of the program, etc. The sorting of the program guide data facilitates the comparison of the previous program guide data with the current program guide data. A determination is made at step 316 whether a program from the previous program guide data is the same program as a program in the current program guide data. For example, if the title of a program from the previous program guide data is the same as the title of a program occurring at the same time on the same day in the current program guide data, a determination may be made that the program is a recurring program. Thus, the title character string "CREATIVE COMPUTING" appearing last FRIDAY at 7:00 p.m. on channel 13 may be compared to the title character string "CREATIVE COMPUTING" scheduled for this Friday at 7:00 p.m. on channel 13. Since the title text strings are identical, it may be determined that the programs are the same program, and therefore it is a recurring program. If the programs are not determined to be the same, program guide data may continue to be sorted at step 314 until all programs have been compared.

In the event it is determined that a program is a recurring program, the program is set as a recurring program in the program guide data at step 318. For example, a field of the program guide data for each program may have two values. A first value in the field (e.g., "FALSE" or logical "0") may indicate that the program is non-recurring, or has not yet been determined to be recurring. A second value in the field (e.g., "TRUE" or logical "1") may indicate that the program has been set as a recurring program. All programs may be set as non-recurring by default until method 300 determines that the program is recurring. Future program guide data is generated at step 320. For example, although the current program guide data may only include information for the next 3 day period, future program guide data for the next full week may be generated by information handling system 100, instead of being downloaded, by inserting program guide data at step 322 for programs that have been determined to be recurring in future day and time slots. The future program guide data may be displayed at step 324 on a display 114 coupled to information handling system. Thus, future programming for time periods beyond that covered by current program guide data may be determined at least in part such that program guide having future program data may be displayed. Furthermore, by determining which programs in program guide data are recurring programs, the electronic program guide may be separated into multiple views. For example, a present or future program guide may display only programs that are recurring and not programs that are not recurring. Conversely, a present or future program guide may display only programs that are not recurring and not programs that are recurring. Additionally, a present or future program guide may display both programs that are recurring and non-recurring simultaneously, but indicate the recurring (or conversely the non-recurring) programs with an appropriate indicia. For example, recurring programs may be marked with an asterisk or highlighted in a different color than non-recurring programs. The displaying of program guide data in the manner described may be controlled by a program guide loader, a program of instructions for converting program guide data in the format obtained from program guide server 212 to a format capable of being utilized by the electronic program guide and displayed on display 114. Further, by utilizing a future program guide, a user may program information handling system 100 to automatically record a program occurring beyond the time period covered by current electronic program guide data.

Figure 4:
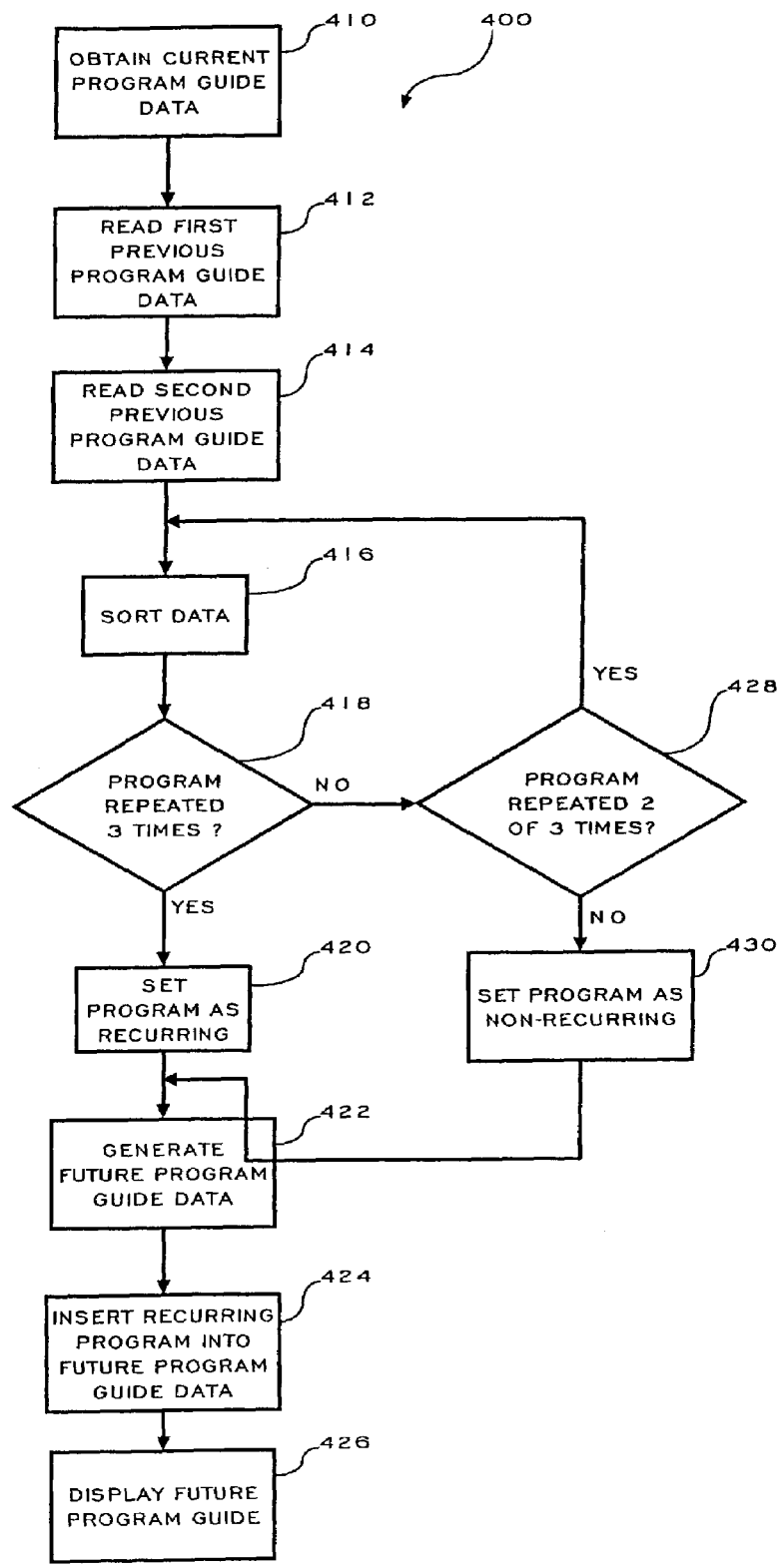
FIG. 4 is a flow diagram of an alternative method for detecting and generating program guide entries of an electronic program guide for future programming in accordance with the present invention.

Referring now to FIG. 4, a flow diagram of an alternative method for detecting and generating program guide entries of an electronic program guide for future programming will be discussed. Method 400 is substantially similar to method 300 with the exceptions that are discussed herein. Method 400 initiates with obtaining current program guide data at step 410. Two records or lists of previous program guide data are stored in an information storage medium (e.g., auxiliary memory 106) coupled to information handling system 100 such that programming for three identical days of three successive weeks may be compared, the third week being from current program guide data. For example, a first record of previous program guide data may include Friday of a first week, a second record of previous program guide data may include Friday of a second week, and current program guide data may include Friday of the current week wherein the first week is two weeks prior to the current week and the second week is one week prior to the current week. The first previous program guide data is read at step 412 and the second previous program guide data is read at step 414. The program guide data (first previous, second previous and current) is sorted at step 416. A determination is made at step 418 whether a program of the current program guide data is the same as a program from the first previous program guide data and as the second program guide data such that the program has been repeated for three times in three time periods. The step of determining whether the program has repeated three times prevents programs that, although they may have been programmed at two consecutive times, are not in fact actual recurring programs. For example, such repeated but non-recurring programs may include a miniseries, sporting event, two-part special programming, etc. If a program has not repeated three times, then a determination is made at step 428 whether the program has repeated two of the three periods of program guide data. If the program has repeated two of the three periods of program guide data, method 400 may continue sorting data at step 416 until a determination at step 418 has been made for all programs in the current program guide data. If it is determined that the program has not repeated for two of the three program guide data periods, then the program is set as non-recurring program at step 430. If it is determined that a program has repeated three times in three program guide data periods, the program may be set as a recurring program at step 420.

Future program guide data may be generated at step 422, and recurring programs may be inserted into the future program guide data at step 424. The future program guide may then be displayed at step 426. One skilled in the art may realize that program guide data for multiple times periods may be utilized as well beyond the three described herein (e.g., four or more).

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method for automatically detecting and generating electronic program guide entries of future programming of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

For example, the program guide data may indicate that a specific program is a recurring program, even though the EPG will not automatically generate future listings for this specific program until details about the program are received. Under the present invention, such an indication of recurrence can also be used as an alternative method of determining recurring programs for display in a future program guide.

What is claimed is:

1. A method for generating electronic program guide entries of future programming, comprising:

obtaining a first set of program guide information from an external source, the first set of program guide information including programming for a predetermined current time period, program guide information being unavailable from said external source beyond said predetermined current time period, retrieving a second set of program guide information from an information storage medium, the second set of program guide information including programming for a time period prior to the current time period, and predicting programming information for a future time period beyond the predetermined current time period for which program guide information is available from the external source by comparing the first set of program guide information to the second set of program guide information.

2. The method as claimed in claim 1, further comprising generating a future program guide based upon the predicted programming information.

3. The method as claimed in claim 2, wherein the future program guide includes a future recurring program entry.

4. The method as claimed in claim 3, wherein the second set of program guide information comprises a list stored in the information storage medium.

5. The method as claimed in claim 4, further comprising determining whether a program of the current program guide information is found in the previous program guide information, and setting the program as a recurring program whereupon the future program guide includes the recurring program.

6. The method as claimed in claim 1, further comprising determining whether a program of the current program guide information is found in the previous program guide information, setting the program as a recurring program, and generating a future program guide wherein the future program guide includes the recurring program.

7. A system for generating electronic program guide entries of future programming, comprising:
 a processor for executing a program of instructions for the system;
 a memory coupled to said processor for storing the program of instructions; and
 an information storage medium coupled to said processor;
 wherein the program of instructions causes the system to perform steps for:
  obtaining a first set of program guide information from an external source, the first set of program guide information including programming for a predetermined current time period, program guide information being unavailable from said external source beyond said predetermined current time period,
  retrieving a second set of program guide information from the information storage medium, the second set of program guide information including programming for a previous time period, and
  predicting programming information for a future time period beyond the predetermined current time period for which program guide information is available from the external source by comparing the first set of program guide information to the second set of program guide information.

8. The system as claimed in claim 7, wherein the program of instructions further causes the system to perform the step of generating a future program guide based upon the predicted programming information.

9. The system as claimed in claim 8, wherein the future program guide includes a future recurring program entry.

10. The system as claimed in claim 9, wherein the second set of program guide information comprises a list stored in the information storage medium.

11. The system as claimed in claim 10, wherein the program of instructions further causes the system to perform the step of determining whether a program of the current program guide information is found in the previous program guide information, and setting the program as a recurring program whereupon the future program guide includes the recurring program.

12. The system as claimed in claim 7 wherein the program of instructions further causes the system to perform the step of determining whether a program of the current program guide information is found in the previous program guide information, setting the program as a recurring program, and generating a future program guide wherein the future program guide includes the recurring program.

13. A system for generating electronic program guide entries of future programming, comprising:
 a processor for executing a program of instructions for the system; and
 a memory coupled to said processor for storing the program of instructions;
 an information storage medium coupled to said processor, wherein the program of instructions is capable of causing the system to perform steps for:
  obtaining a first set of program guide information including programming for a predetermined current time period from an external source, program guide information being unavailable from said external source beyond said predetermined current time period,
  retrieving a second set of program guide information from the information storage medium, the second set of program guide information including programming for a previous time period, and
  predicting programming information for a future time period for which programming information is unavailable from the external source by comparing the first set of program guide information to the second set of program guide information.

14. The system as claimed in claim 13, wherein the program of instructions further causes the system to perform the step of generating a future program guide based upon the predicted programming information.

15. The system as claimed in claim 14, wherein the future program guide includes a future recurring program entry.

16. The system as claimed in claim 13, wherein the second set of program guide information comprises a list stored in the information storage medium.

17. The system as claimed in claim 16, wherein the program of instructions further causes the system to perform the step of determining whether a program of the current program guide information is found in the previous program guide information, and setting the program as a recurring program whereupon the future program guide includes the recurring program.

18. The system as claimed in claim 13, wherein the program of instructions further causes the system to perform the step of determining whether a program of the current program guide information is found in the previous program guide information, setting the program as a recurring program, and generating a future program guide wherein the future program guide includes the recurring program.

19. A system for generating electronic program guide entries of future programming, comprising:
 means for obtaining a first set of program guide information from an external source, the first set of program guide information including programming for a predetermined current time period, program guide information being unavailable from said external source beyond said predetermined current time period,
 means for retrieving a second set of program guide information from an information storage medium, the second set of program guide information including programming for a time period prior to the current time period, and means for predicting programming information for a future time period beyond the predetermined current time period for which program guide information is available from the external source by comparing the first set of program guide information to the second set of program guide information.

20. The system as claimed in claim 19, further comprising means for generating a future program guide based upon the predicted programming information.

21. The system as claimed in claim 20, wherein the future program guide includes a future recurring program entry.

22. The system as claimed in claim 19, wherein the second set of program guide information comprises a list stored in the information storage medium.

23. The system as claimed in claim 22, further comprising means for determining whether a program of the current program guide information is found in the previous program guide information, and setting the program as a recurring program whereupon the future program guide includes the recurring program.

24. The system as claimed in claim 19, further comprising means for determining whether a program of the current program guide information is found in the previous program guide information, setting the program as a recurring program, and generating a future program guide wherein the future program guide includes the recurring program.

* * * * *